March 27, 1956 S. O. EVANS 2,739,799
CHARGE-DISCHARGE MECHANISM FOR BILLET HEATING MEANS
Filed Dec. 30, 1952 6 Sheets-Sheet 1
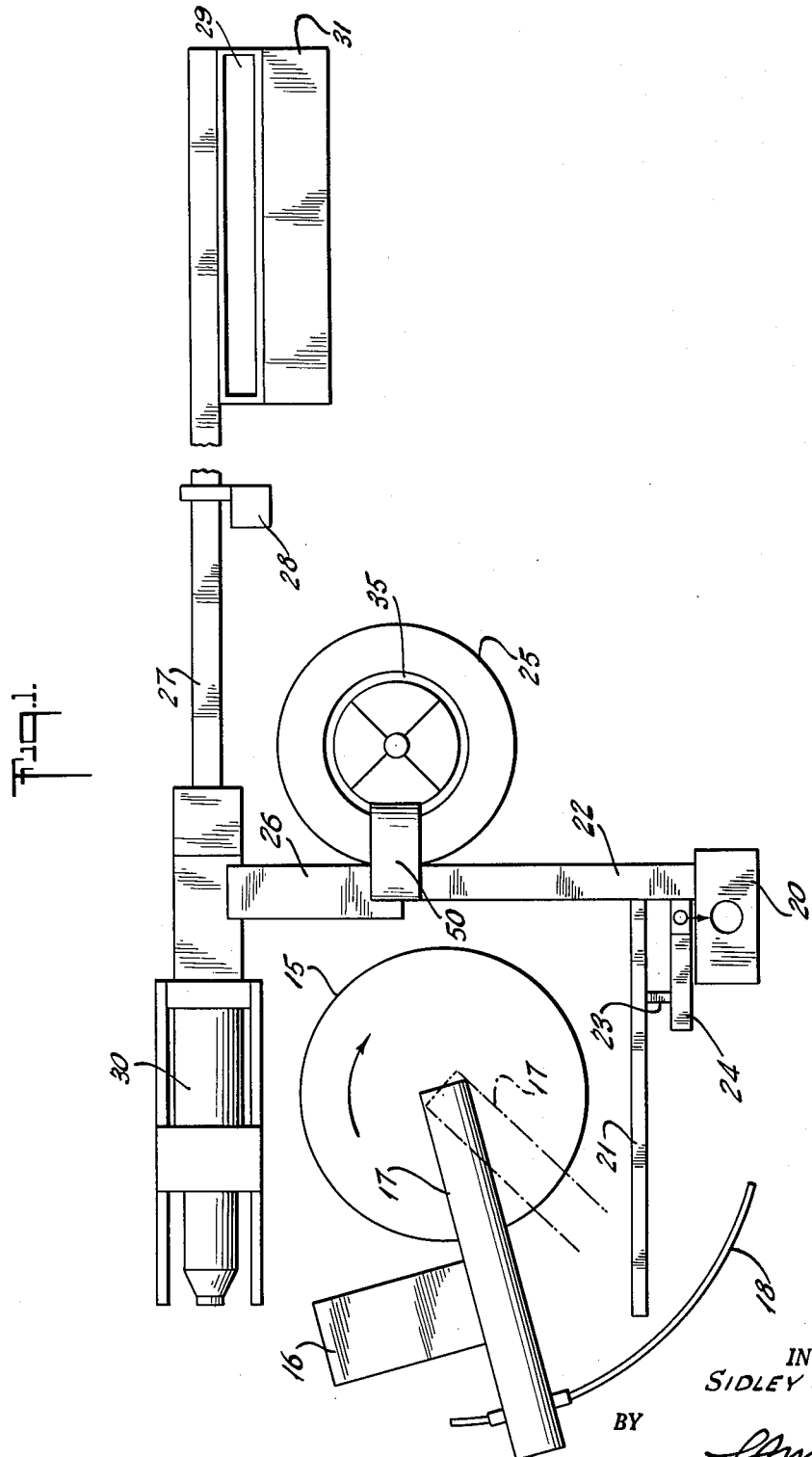
INVENTOR.
SIDLEY O. EVANS
BY
ATTORNEY

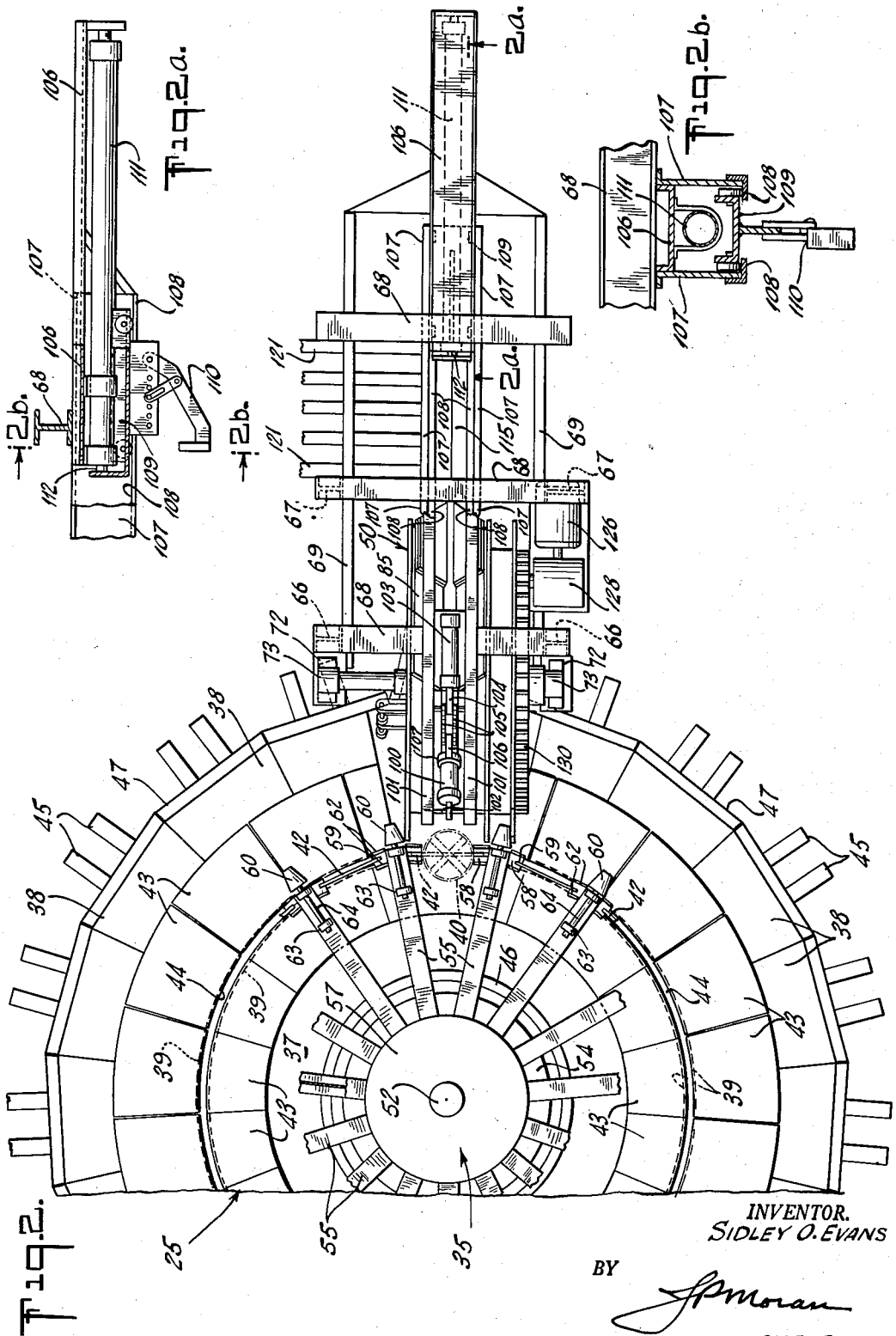

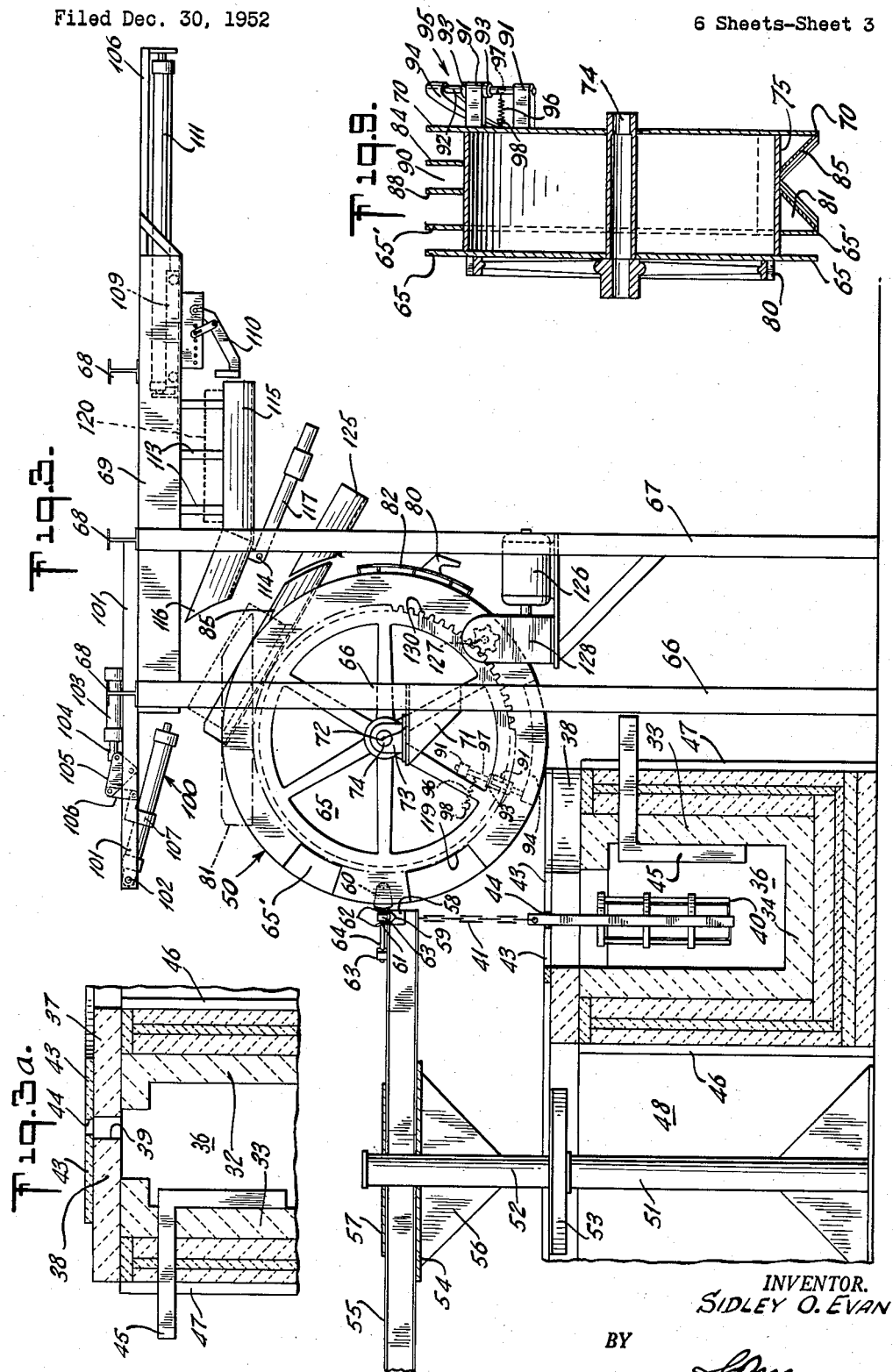

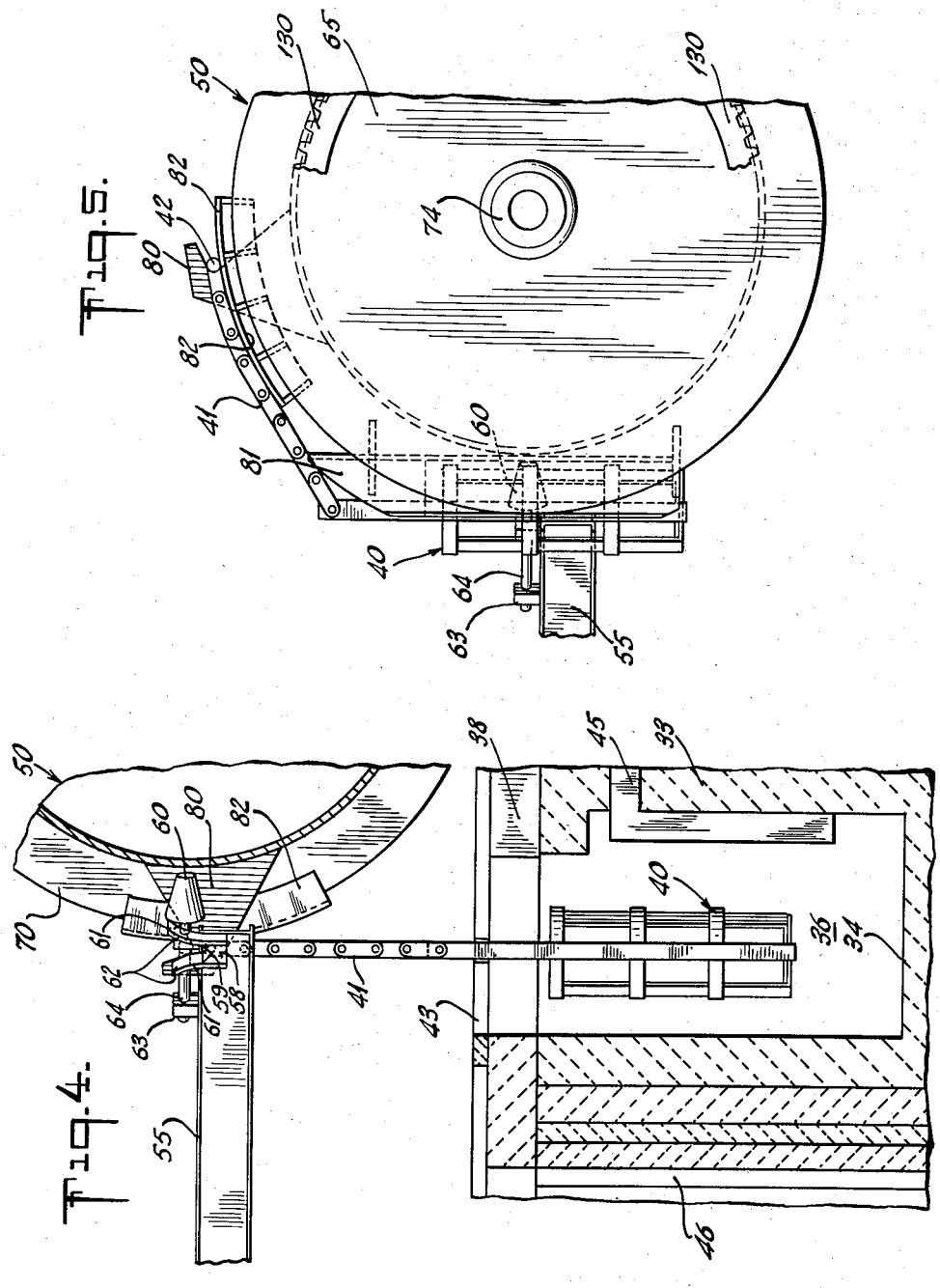

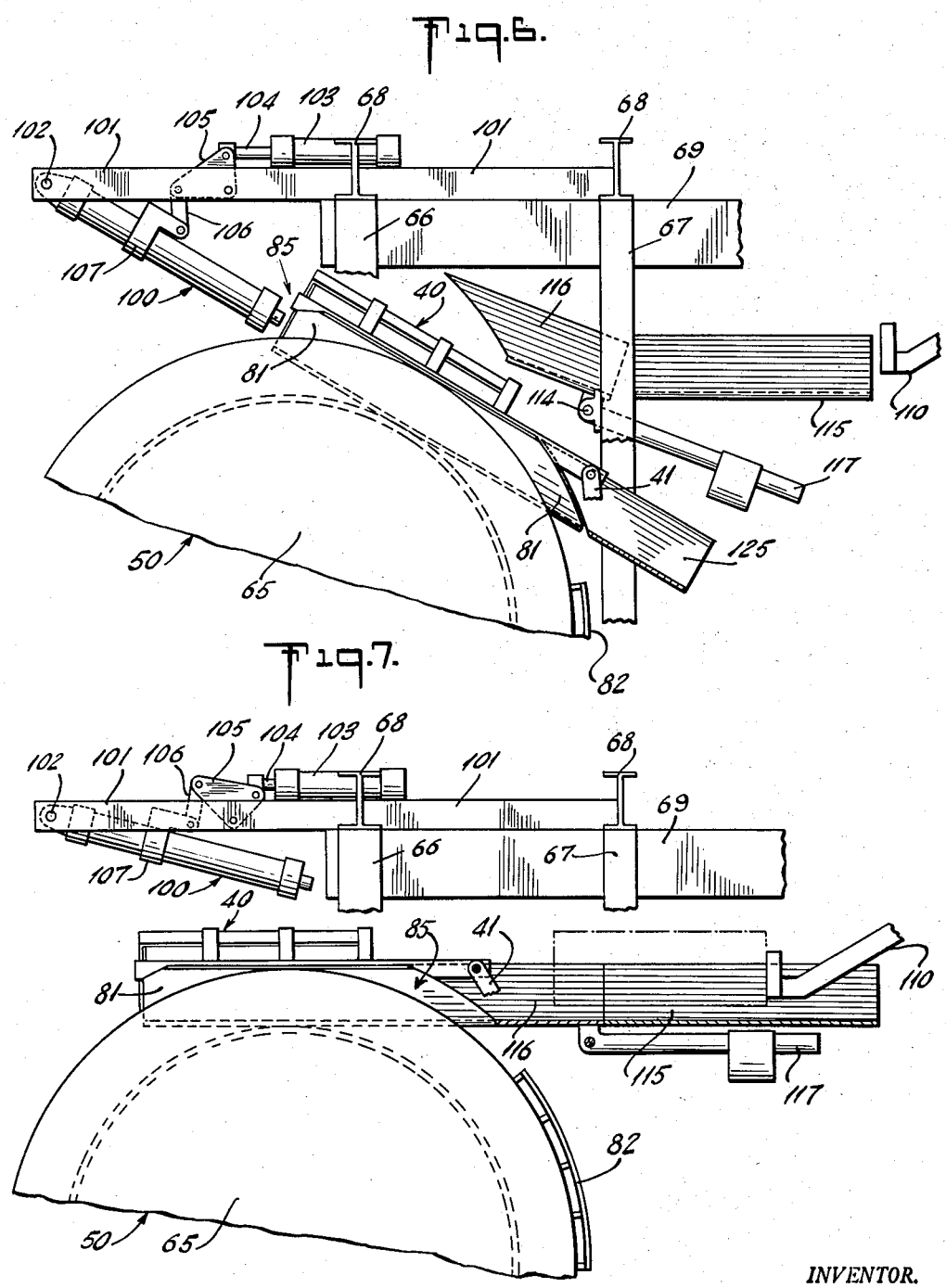

March 27, 1956 S. O. EVANS 2,739,799
CHARGE-DISCHARGE MECHANISM FOR BILLET HEATING MEANS
Filed Dec. 30, 1952 6 Sheets-Sheet 6
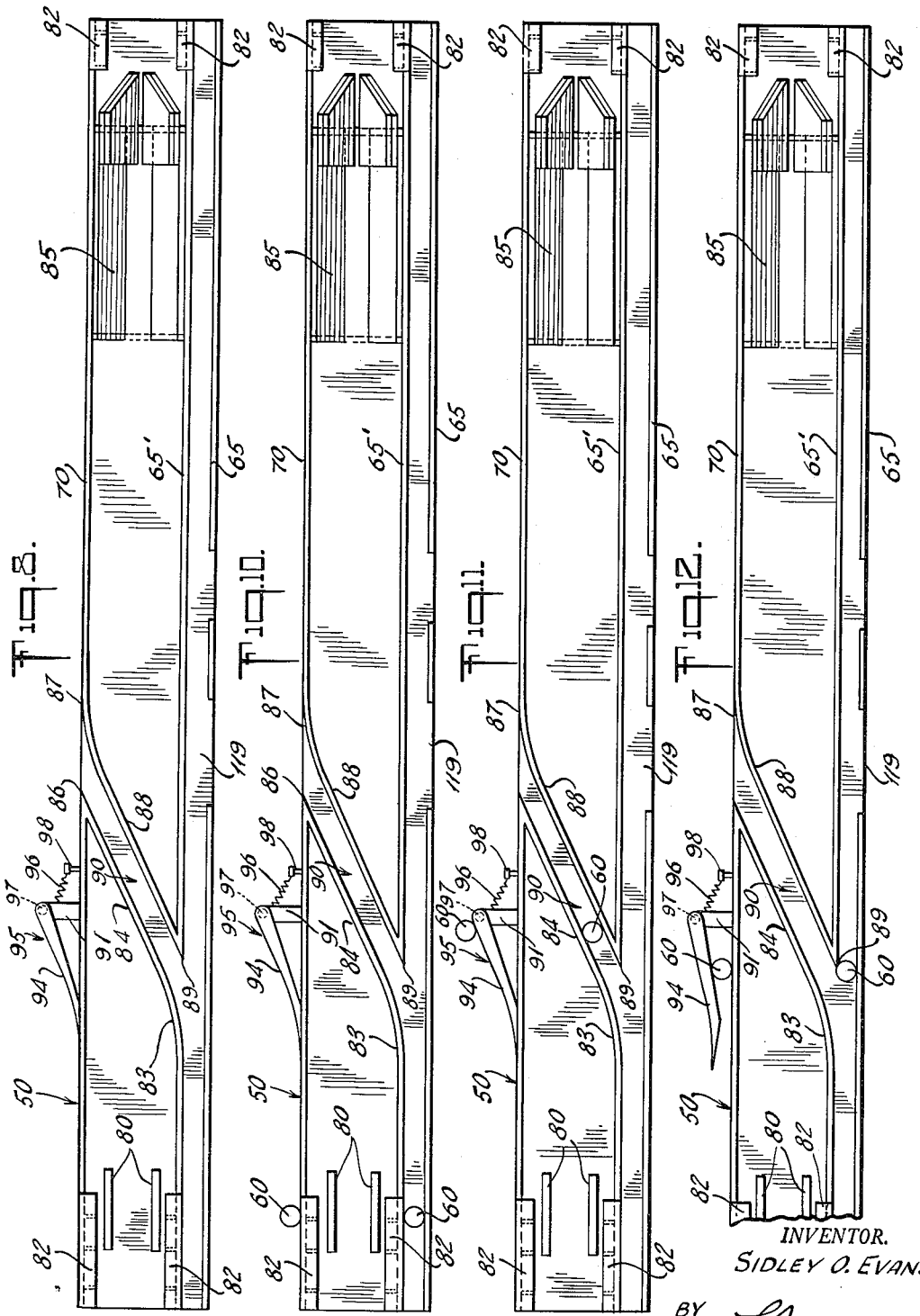
INVENTOR.
SIDLEY O. EVANS
ATTORNEY United States Patent Office 2,739,799
Patented Mar. 27, 1956

2,739,799

CHARGE-DISCHARGE MECHANISM FOR BILLET HEATING MEANS

Sidley O. Evans, Beaver Falls, Pa., assignor to The Babcock & Wilcox Company, New York, N. Y., a corporation of New Jersey Application December 30, 1952, Serial No. 328,688

15 Claims. (Cl. 263—6)

This invention relates to handling apparatus for metal billets and, more particularly, to semi-automatic apparatus for charging billets into a protective atmosphere high temperature heating means and removing highly heated billets from the latter for delivery to hot metal working apparatus.

In certain metal working operations where metal pieces, such as billets, must be heated to a predetermined temperature range for optimum hot working of the pieces, a known expedient is to charge the billets into a furnace, or other heating means, where the temperature of the pieces is raised to the desired high value and maintained at such value until the pieces are removed from the heating means for immediate delivery to the hot working operation. Where it is necessary or desirable that the heated metal pieces be as near scale-free as possible, the heating to working temperature must be effected with the metal pieces in a controlled or protective atmosphere. Due to the high temperature and essentially enclosed nature of a heating means of this type, the charging of billets into the heating means and removal of heated billets therefrom presents a problem.

A known type of high temperature heating means having a controlled protective atmosphere is a bath of molten salt whose temperature is controllably maintained at the desired high value, such as 2250° F., for example, in the case of steel. The metal pieces or billets are held in this bath for a period sufficient for the metal pieces to attain the temperature of the bath.

The present invention is more particularly directed to a novel elevator or loader provided with billet handling means arranged to be moved into the heating means to extract a heated billet therefrom. The elevator then moves the heated billet to a position where it can be discharged from the elevator onto hot billet feeding means for the hot metal working operation. In a succeeding movement of the elevator, a fresh billet is loaded onto the heating means by the elevator. As an additional feature, the billet elevator or loader is provided with cam means arranged to control the movement of a billet carrier through the heating means.

One metal working process, in which the invention billet charge-discharge mechanism finds particular applicability, is the extrusion of plain or alloy steels by forcing a heated billet against a die to form an elongated piece having a predetermined cross-sectional shape, such as a tube for example. The invention will accordingly be described, by way of specific example only, as used in charging and discharging billets from a controlled atmosphere heating means for billets to be extruded.

For best results in such extrusion, the steel should be at a temperature of about 2250° F. and as scale-free as possible. To this end, the steel billets are preheated in suitable means, such as a rotary hearth gas-fired furnace, to a temperature of about 1600° F. They are then removed from this furnace and immersed in a molten salt heating bath, where they are held for a predetermined interval of about 20–30 minutes to complete the heating for hot working while protected from the atmosphere. As the billets are heated to the working temperature, they are successively removed from the bath and immediately fed to the extrusion press. If tubing is to be extruded, the billets are heated to piercing temperature in the gas-fired furnace, pierced with a slightly over-size I. D. in a piercing press, and then charged into the molten salt bath.

In this specific example of the invention, the heating bath has associated therewith a travelling carrier arranged to receive and support billets for movement through the bath. This carrier is provided with a plurality of removable perforated holders or metal baskets, each arranged to contain and support a metal billet immersed in the bath.

Movement of the carrier is controlled by a reversely movable stepping cam device on the billet elevator or loader, and arranged, during each cycle of operation, to step the carrier and its billet holders one step or position along the bath. As the billet charge-discharge elevator starts its cycle of operation, it picks up a holder from the carrier and moves this holder into position for discharge of the heated billet from the holder onto transport means arranged to carry the billet to hot working apparatus, such as the extrusion press. The elevator then moves the holder to a position where the latter is reloaded with a billet from the preheating furnace or the piercing press. The elevator now moves the reloaded holder onto the carrier and, in continuation of this latter movement, the cam arrangement steps the carrier one position along the bath.

Preferably, the heating means is annular, and the carrier is rotatably mounted on the bath axis and comprises a plurality of equally spaced radial arms. Adjacent the ends of these arms are holding means, aligned with the heating means or bath, arranged to receive and support the billet holders. The ends of the arms carry cam followers engageable by the cam.

The billet charge-discharge elevator is a cylinder or drum mounted for rotation in a central plane including the axis of rotation of the carrier. On the periphery of the elevator is a hook arranged to project between a pair of carrier arms to engage the bail of a holder or basket and lift the latter from the carrier. Circumferentially spaced from this hook is a support, such as a trough, on the drum periphery, arranged to have the billet holder lie therein, the holder being connected to its bail by flexible means, such as a pair of chains.

In picking up a billet holder, the drum carries the holder support upwardly and past the top center position, and to a position inclined sufficiently to the horizontal that the billet will move by gravity out of the basket onto billet feeding means for the extrusion press. A ram may be provided to assist discharge of the billet from the holder. The elevator then returns the support and holder to top center where a ram charges a fresh billet into the holder. The drum then continues its reverse rotation and the bail of the holder engages in the carrier arms.

Following the hook, in the reverse movement of the drum, are a series of cam tracks on the drum periphery. As the drum continues its reverse movement, after depositing the billet holder on the carrier arms, the cam tracks engage the cam followers on the ends of the arms. These tracks have a diagonal or sloping section which, as the followers roll over it, move the carrier by the distance between two arms. During forward movement of the drum in picking up a billet "basket," a spring switch in the cam tracks prevents reverse movement of the carrier, maintaining the latter in the previously stepped position.

The cam tracks are so designed as to maintain the carrier locked against movement at the times a billet holder is picked from the carrier or replaced thereon, thus assuring alignment of the elevator hooks with the bail of the billet holder during pickup, and alignment of the bail with the arm holding means during replacement of the billet holder onto the carrier.

For an understanding of the invention principles, reference is made to the following detailed description of a typical embodiment thereof as illustrated in the accompanying drawings. In the drawings:

Fig. 1 is a schematic plan view of a metal extrusion arrangement incorporating the invention;

Fig. 2 is a plan view of an annular heating bath having the invention rotatable carrier and billet elevator and cam associated therewith;

Fig. 2A is an approximate and fragmentary sectional view on the line 2A—2A of Fig. 2, with parts in elevation;

Fig. 2B is a transverse sectional view on the line 2B—2B of Fig. 2A;

Fig. 3 is a side elevation view, partly in section, of the apparatus shown in Fig. 2;

Fig. 3A is a fragmentary vertical sectional view of the heating bath;

Fig. 4 is a partial side elevation view of the carrier and drum elevator, with the hook ready to lift a loaded billet holder from the carrier;

Fig. 5 is a view, similar to Fig. 4, showing the loaded holder in place on the drum;

Fig. 6 is a view, similar to Fig. 4, showing the billet holder in the unloading position;

Fig. 7 is a view, similar to Fig. 4, showing the billet holder in the re-loading position;

Fig. 8 is a developed view of the drum surface and cam tracks;

Fig. 9 is a diametric sectional view of the drum;

Fig. 10 is a partial development view of the drum showing the carrier arm cam followers just before the start of a carrier stepping sequence; and Figs. 11 and 12 are views similar to Fig. 10 showing successive positions of the carrier arm cam followers during the carrier stepping sequence.

Referring to Fig. 1 of the drawing, which schematically illustrates a metal extrusion plant layout, a rotary hearth pre-heating furnace is illustrated at 15, a billet piercing press at 20, a molten salt billet heating bath at 25, and an extrusion press at 30. The billets to be pre-heated are first placed on a loading platform or station 16. A billet loader 17 is arranged with furnace 15, being swingable through an arc about the center of furnace 15, the outer end of loader 17 running on an arcuate track 18. The loader is movable between the furnace charging position shown in full lines and a billet removing position shown in dotted lines. The furnace 15 rotates, at a very slow rate, in a clockwise direction as viewed in Fig. 1. The size and rate of intermittent rotation of furnace 15 are so selected that during the time the billets are moved from the solid line loading position to the dotted line unloading position they are heated uniformly to the desired pre-heating or piercing temperature.

As the billets, heated to the desired working temperature, are removed from furnace 15 by loader 17, they are placed on a conveyer 21. Depending upon whether the billets are to be extruded in the solid condition or to be extruded as tubing, they are moved by conveyer 21 either directly to a second conveying means 22, in the case of solid billets, or to a cross-conveyor 23 if the billets are to be pierced. Cross-conveyor 23 carries billets to a loading conveyor 24 for a vertically arranged billet piercing press 20. In the particular arrangement schematically illustrated, the piercing press 20 pierces an axial hole longitudinally of the billet and somewhat larger in size than the internal diameter of the tubing to be extruded.

The billets delivered to conveying means 22, either directly by conveyer 21 or from piercing press 20, are carried by the conveying means to a position associated with drum elevator and control cam 50. This device, which forms the principal feature of the invention, loads billets into heating bath 25 and removes billets from the latter for delivery to extrusion press 30, and, as an additional feature, controls the movements of the billets immersed in the heating bath 25. For this purpose, cam tracks on drum 50 control the movement of a travelling carrier 35 constructed and arranged to move billets through the heating bath 25. In the particular arrangement shown, heating bath 25 is annular in plan and carrier 35 is mounted for rotation on the axis of bath 25. The elevator drum is arranged to rotate on a central plane including the axis of rotation of carrier 35.

As will be described more fully hereinafter, carrier 35 is provided with equally spaced radial arms having means adjacent their outer ends to receive and support perforated billet holders or baskets in alignment with bath 25 for immersion of the billets therein. The outer ends of the arms carry cam followers engaged with cam tracks on the peripheral surface of drum elevator 50.

Drum 50 has a reversible cycle for loading and unloading furnace 25 and stepping carrier 35 along the furnace. In its initial movement in a forward direction, a hook on drum 50 picks up a billet holder from carrier 35, while the latter is held positively fixed against rotation by cam tracks on the drum, and moves this billet holder to a position where the billet therein may be ejected by a suitable ram or the like onto transport means 26 which carries the ejected billet to the extrusion press 30. The latter extrudes the billet as an elongated element, such as a tube, onto an outlet table 27, preferably in the form of a pallet conveyor. A saw 28 cuts the piece to length, and the cut piece is then moved along the outlet table to a position where it can be moved laterally to a quench tank 29 or onto a tube rack or table 31.

After the billet has been ejected from the billet holder on elevator drum 50, the latter is reversed in movement toward a loading position where a fresh billet from conveying means 22 is moved into the holder. The drum then continues such reverse movement and deposits the re-loaded billet holder on the arms of carrier 35, the cam tracks holding the carrier 35 positively fixed against rotation during the re-loading of the billet holder onto the carrier. As the drum continues such reverse movement, cam tracks on its periphery, in engagement with the cam followers on the ends of the carrier arms, move these arms in a direction to step carrier 35 one position around heating bath 25. The drum is then ready to repeat the cycle of unloading a billet from bath 25, ejecting this billet onto transport means 26, re-loading a billet into bath 25, and stepping carrier 35 around the bath.

In performing the illustrated process, the billets are maintained in the heating bath 25 for a sufficient period, such as 20 to 30 minutes, to assure uniform heating to the correct temperature for extrusion.

The molten salt heating bath 25, carrier 35, drum 50, and the billet ejecting and re-loading means associated with drum 50 are more clearly illustrated in Figs. 2 and 3, further details of the drum and carrier, and the inter-relation thereof, being shown in Figs. 4 through 12.

Referring first to Figs. 2 and 3, the heating bath 25, which preferably is recessed below floor level in practice, comprises inner and outer annular refractory linings 32 and 33, and a refractory floor 34, all defining an annular working space 36 of a depth sufficient for total immersion of the longest billets to be handled. The inner metal casing 46 is provided for lining 32 and an outer metal casing 47 surrounds lining 33. The refractory linings 32 and 33 are extended toward each other at their upper ends, as at 37 and 38, to leave only a narrow annular opening 39 through which the chains 41 connecting billet holders 40 to their bails or top cross bars 42 may pass. However, roof lining sections 37, 38 are broken away adjacent drum 50, to allow holders 40 to be lifted from workspace 36 and replaced thereinto. The annular opening 39 is further narrowed by heat insulating plates or slabs 43 laid on top of sections 37, 38 and having their inner end separated by a distance only slightly greater than the width of chains 41, as indicated at 44. Thus, the working space 36 is substantially fully enclosed except for annular slot 44 and the roof opening adjacent cam 50.

The working space 36 is substantially filled with molten salt maintained at a temperature of approximately 2250° F. by electric energy delivered to the bath through electrodes, such as 45, the energy input being preferably automatically controlled to maintain the desired bath temperature. A preferred material for the molten salt bath is barium chloride. Additives may be used for rectification of the salt bath.

In the central cylindrical space 48 deferred by the inner metal casing 46 is provided a tubular column 51 substantially coaxial with working space 36. This column contains spaced bearings (not shown) for the rotatable mast 52 of carrier 35, this mast extending substantially above the salt bath as may be seen in Fig. 3. Radial struts 53 connect the upper end of column 51 to inner casing 46. Near its upper end, mast 52 has secured thereto a relatively large circular plate 54 braced by radial gussets 56. Above plate 54, a second and smaller circular plate 57 is secured to mast 52. These two plates cooperatively support and secure carrier arms 55 onto mast 52, the inner ends of the radially extending arms 55 being bolted between plates 54 and 57. The arms 55 are preferably in the form of I-beams or H-beams are equally spaced angularly of mast 52, and have lengths such that their outer ends extend slightly beyond narrow annular slot 44.

At the outer end of each arm 55, and on either side thereof, are blocks 58 having V-shaped grooves 59 in their upper surfaces, these blocks projecting laterally from the arms and the facing blocks on adjacent arms having their slots 59 in alignment to receive bail bars 42 of billet holders 40. These bars are of a length sufficiently short to fit easily between adjacent arms yet of sufficient length to have substantially positive engagement in the slots 59 of facing blocks 58. The bails 42 may be guided into slots 59 by vertical channel guides 61 having the upper ends of their flanges bent outwardly as at 62.

On the upper surface of each arm 55, and adjacent the outer end, are a pair of longitudinally spaced blocks 63 which support a radial shaft 64 extending beyond the outer end of the arm. The outer end of each shaft 64 has rotatably mounted thereon a cam follower 60, there being one of these cam followers for each arm 55. The cam followers, as may be seen in Figs. 2 and 3, are substantially frusto-conical, having their outer ends rounded off for readier engagement with the cam tracks of drum elevator 50.

The drum elevator 50 and its associated billet charge and discharge rams and troughs are supported on a framework including H-columns 66, 67 interconnected by lateral members 68 and longitudinal members 69. Gusset plates 71 on the columns 66 support shelves 72 on which are mounted laterally spaced bearings 73 for the drum axle 74. Axle 74 is so oriented that the central diametric plane of drum 50 includes the axis of rotation of carrier mast 52, and a horizontal plane through axle 74 includes the axis of cam followers 60.

Referring to Figs. 2, 3, 8 and 9, drum 50 comprises a pair of circular side plates 65, 70 interconnected by a cylindrical drum surface 75. The drum surface diameter is substantially less than that of plates 65, 70, so that the latter project radially beyond the drum surface to form tracks for the cam followers 60. A third main cam track is formed by an annular plate 65' surrounding drum 70 adjacent plate 65.

At one point on its periphery, which point will hereinafter be used as the reference point, drum surface 75 has secured thereto a pair of laterally spaced hooks 80 each equidistant from the centerline between plates 65 and 70. The reference line is the axis of a bail bar 42 lying in the hooks 80.

At a point spaced "downwardly" or trailing from hooks 80 a little more than the length of the flexible supports 41 of holder 40, a V-trough 85 is centered on the drum and tangential thereto. This trough is centered between tracks 65' and 70 and rigidly supported on the drum by support plates 81 welded to the drum, the trough, and tracks 65', 70. Between the hooks 80 and trough 85 are arranged a pair of circular wrapping guides 82, each supported from one of the tracks 65' or 70. These guides are provided for the flexible supports 41 to lie against as hooks 80 pick up a holder 40 to rest in trough 85.

At a point 83 on drum 75 spaced from hooks 80 in the opposite direction from trough 85, plate or track 65' is smoothly curved inwardly and then diagonally at 84 toward track 70, to intersect the latter in a point 86. Similarly, track or plate 70 is smoothly curved inwardly from a point 87 to form a diagonal 88 parallel to the diagonal 84 of track 65', and merging with track 65' in a point 89. The diagonals are spaced by the same distance as plates 65 and 65' to form a "crossover" 90 for cam followers 60. As one cam follower moves along crossover 90, the next cam follower may enter the space between tracks 65 and 65' through an opening 119 in plate or track 65 extending somewhat beyond points 86 and 87 circumferentially of the drum 75.

Lateral displacement of the cam followers across the drum surface is effected by a "spring switch" generally indicated at 95, and shown most clearly in Figs. 8 and 9. Laterally opposite a point about ⅓ along crossover 90 from point 83, a pair of radially spaced bars 91 are welded to the exterior surface of plate 70 so as to project outwardly therefrom parallel to axle 74. These bars rotatably support a radially extending shaft 92 in their outer ends, the shaft extending parallel to plate 70 and outwardly to the periphery thereof. Shaft 92 is positioned in the bars by collars 93. The outer end of the shaft has secured thereto a switch point 94 having its free end shaped to lie flat against plate 70 with point 94 extending generally parallel to crossover 90. A spring 96, connected between a radial pin 97 on shaft 92 and a pin 98 on plate 70 biases point 94 toward plate 70. The point has a lateral width substantially equal to the height of track 70 above the surface of drum 75, and is curved edgewise about a radius equal to that of plate 70. The operation of the foregoing "carrier stepping" arrangement will be described more fully hereinafter.

A pair of laterally spaced angle irons 101 are secured to the tops of the frame cross members 68 so as to project toward the axis of bath 25. The outer ends of angles 101 carry ears 102 supporting a pivot for a billet ejecting ram 100. The latter is normally held in an upward, billet-holder clearing position by an air cylinder 103 and connecting linkage. Cylinder 103 is supported on angles 101 adjacent the near crosspiece 68, and its piston 104 is connected to one corner of a triangular plate link 105. Link 105 is pivoted, adjacent another corner, to the angles 101, and its third corner is connected by a link 106 to a collar 107 intermediate the ends of ram 100. In the position shown in Fig. 3, piston 104 of cylinder 103 is retracted, swinging ram 100, through link 105, upwardly out of the path of a billet holder 40 on drum cam 50.

A channel 106 is secured to the undersides of crosspieces 68 to project outwardly away from the bath 25. This channel has side plates 107' welded to its flanges and extending downwardly therefrom, and inwardly extending angles 108 are welded to the lower edges of plates 107. These channels form a track for a car 109 travelling thereover and having depending therefrom a billet loading ram 110. The ram 110 is operated by a cylinder 111 secured along the underside of channel 106 and having its piston 112 secured to the forward end of car 109.

A billet receiving trough 115 is supported beneath channel 106, extending between the front and rear columns 67. Trough 115 is suspended from channel 106 by supports 113. Ears 114 on the forward supports 113 pivotally support a trough section 116 which is biased to swing upwardly by a weighted arm 117. The lower edges of trough 115 and of section 116, when the latter is swung downwardly, are horizontal and substantially tangent to drum 50. The ram 110 is arranged to move longitudinally of trough 115 to load a billet from the trough into the holder then on cam 50, as will be presently described.

The operation of carrier 35 as controlled by the carrier stepping cam tracks of drum 50 will be described with particular reference to Figs. 4-8 and 10-12. When a heated, and usually pierced, billet 120 is being moved along conveying means 22, elevator drum 50, which has previously been rotated to the position of Fig. 4, is caused to rotate clockwise. At the time hooks 80 engage holder bail 42, carrier 35 is held positively against rotation by virtue of the cam followers 60 being engaged with tracks 65, 65', 70 in advance of crossover 90 and switch point 94. One follower 60 engages the outer surface of track 70 and an adjacent follower 60 lies between tracks 65 and 65', as may be seen in Fig. 10.

As drum 50 rotates clockwise, the followers 60 are held fixed laterally of the cam by the straight sections of the cam tracks trailing hooks 80 in this direction of drum rotation. The flexible bail supports 81 of the billet holder 40 wrap over guides 82 and trough 85 engages billet holder 40. The latter then lies in trough 85, as seen in Fig. 5.

The drum rotation is continued until trough 85 reaches the position of Figs. 3 and 6, where it has passed the uppermost position and is tilted downwardly away from bath 25. Trough 85 is now aligned with a discharge chute 125 directed toward transport means 26, which may be a transfer car for example.

At this position, the inclination of trough 85 and holder 40 is preferably such that the billet 120 will slide out of holder 40 and down chute 125. However, this gravity movement may be assisted, and certainty of discharge assured, by use of the discharge ram 100. In the discharge operation, air cylinder 103 is operated to lower ram 100 into alignment with the billet 120 in holder 40 lying in trough 85. The ram 100 is then extended to push the billet out of holder or basket 40 onto chute 125 and thus onto transfer means 26. The latter transfers the billet to extrusion press 30. The ram 100 is subsequently retracted and swung upwardly.

Meanwhile, conveying means 22 has brought a fresh billet to trough 115. This conveying means may be, for example, a self-tilted or cam-tilted transfer car operating on inclined rails 121 and dumping the billet into the trough 115. Drum 50 is now rotated clockwise to the re-loading position of Fig. 7, in which trough 85 is aligned with holding trough 115. Air cylinder 111 is now operated to move car 109 and reload ram 110 to the left to move the fresh billet toward trough 85. As the billet moves out of trough 110, it swings trough section 116 downwardly to mate with trough 85. The billet is thus continuously supported as it moves into the holder on trough 85. Drum 50 is now further rotated counterclockwise to drop the re-loaded billet holder into bath 25. The holder 40 moves away from the drum surface 75 as it moves into the vertical position, and flexible supports 41 progressively unwrap from guides 82. Finally, bail bar 42 engages in the notches 59 of blocks 58. During all this period, carrier 35 has been positively held against rotation by virtue of cam followers 60 engaging straight continuous portions of tracks 65, 65' and 70.

With cam followers 60 again in the position of Fig. 10, carrier 35 is ready for stepping one position around the bath 25. As drum 50 is further rotated counterclockwise, one follower 60 rides along the outside of spring closed switch point 94, as seen in Fig. 10. The other follower 60 is thus constrained to enter crossover 90. As the drum rotation continues, the followers 60 move laterally of the drum surface until the follower 60 initially between tracks 65, 65' has moved to the outer side of track 70. Simultaneously, the follower 60 of the next adjacent trailing arm will pass through the gap 119 to the space between tracks 65 and 65'. The carrier 35 has now been rotated by an amount equal to the angle between the centerlines of two adjacent arms 55.

After such stepping, the drum is again caused to rotate clockwise, as indicated in Fig. 12. The follower 60 riding along the outer surface of track 70 swings point 94 outwardly, riding along the inner surface of the latter. The drum rotation is continued until hooks 80 are again engaged with a bail 42 of the next holder 40, as in the position of Fig. 4. The billet discharging and re-loading cycle can now be repeated.

The drum 50 is operated by a motor 126 driving a pinion 127 through a gear reducer 128, pinion 127 meshing with a large ring gear 130 bolted to the outer side of plate 65 coaxially therewith. The drum may be stopped in the pick up, ejecting, and re-loading position automatically, if desired, by the use of suitably positioned limit switches.

The described heating means loader and unloader, and carrier stepper, is positive in its operation due to the mechanical interconnection of the carrier and the cam tracks on the loader. Furthermore, at the critical position point when the holders or baskets 40 are actually removed from the carrier arms and replaced thereon, the carrier is positively mechanically locked against rotation. Hence, the support blocks 58 are precisely positioned for operation of hooks 80 on the holder bails 42.

While a specific embodiment of the invention has been shown and described in detail to illustrate the application of the invention principles, it will be understood that the invention may be embodied otherwise without departing from such principles.

What is claimed is:

1. Apparatus for charging metal pieces into a heating means and removing heated metal pieces therefrom, comprising an elevator reversely movable relative to said heating means between a pick up position, a discharge position, and a loading position; support means on said elevator constructed and arranged to support one of the metal pieces; and mechanism operable to operate said elevator to move said support means to the pick up position to pick up a heated metal piece from the heating means for movement to the discharge position for discharge of the heated piece from said support means and to the loading position for positioning of a fresh metal piece in said support means; said mechanism being operable to operate said elevator to move said support means from the loading position toward said heating means to charge the fresh metal piece into the latter.

2. Apparatus for charging metal pieces into a heating means and removing heated metal pieces therefrom, comprising an elevator reversely movable relative to said heating means between a pick up position, a discharge position, and a loading position; support means on said elevator constructed and arranged to support one of the metal pieces; mechanism operable to operate said elevator to move said support means to the pick up position to pick up a heated metal piece from the heating means for movement to the discharge position for discharge of the heated piece from said support means; means at said discharge position operable to receive the discharged piece from said support means; and means at the loading position operable to position a fresh metal piece in said support means; said mechanism being operable to operate said elevator to return said support means from the loading position toward said heating means to charge the fresh metal piece into the latter.

3. Apparatus for charging metal pieces into a heating means and removing heated metal pieces therefrom, comprising a plurality of billet holders mounted for movement through said heating means; an elevator reversely movable relative to said heating means between a pick up position, a discharge position, and a loading position; support means on said elevator constructed and arranged to support one of the billet holders; and mechanism operable to operate said elevator to move said support means to the pick up position to pick up a billet holder from the heating means for movement to the discharge position for discharge of the heated billet from said billet holder and to the loading position for positioning of a fresh billet in said billet holder; said mechanism being operable to operate said elevator to move said billet holder from the loading position toward said heating means to charge the fresh billet into the latter.

4. Apparatus for charging metal pieces into a heating means and removing heated metal pieces therefrom, comprising a plurality of billet holders mounted for movement through said heating means; an elevator reversely movable relative to said heating means between a pick up position, a discharge position, and a loading position; support means on said elevator constructed and arranged to support one of the billet holders; mechanism operable to operate said elevator to move said support means to the pick up position to pickup a billet holder from the heating means for movement to the discharge position for discharge of the heated billet from said billet holder; means at said discharge position operable to receive the discharged billet from said billet holder; and means at the loading position operable to position a fresh billet in said billet holder; said mechanism being operable to operate said elevator to move said billet holder from the loading position toward said heating means to charge the fresh billet into the latter.

5. Apparatus for charging metal pieces into a heating bath and removing heated metal pieces therefrom, comprising a plurality of billet holders mounted for movement through said bath; an elevator mounted in operative association with said bath and reversely rotatable in a substantially vertical plane between a pick up position, a discharge position, and a loading position; support means on said elevator constructed and arranged to support one of the billet holders; mechanism operable to rotate said elevator to move said support means to the pick up position to pick up a billet holder from the bath for movement to the discharge position for discharge of the heated billet from said billet holder; means at said discharge position operable to receive the discharged billet from said billet holder; and means at the loading position operable to position a fresh billet in said billet holder; said mechanism being operable to rotate said elevator to move said billet holder from the loading position toward said bath to charge the fresh billet into the latter.

6. Apparatus for charging metal pieces into a heating bath and removing heated metal pieces therefrom, comprising a plurality of billet holders mounted for substantially horizontal movement through said bath; an elevator mounted in operative association with said bath and rotatable in a substantially vertical plane intersecting the path of movement of said billet holders through said bath; support means on said elevator constructed and arranged to support one of the billet holders; mechanism operable to rotate said elevator to move said support means to pick up a billet holder from the bath for movement to a position for discharge of the heated billet from said billet holder; means at said position operable to receive the discharged billet from said billet holder; means operable to position a fresh billet in said billet holder; said mechanism being operable to rotate said elevator to move said billet holder toward said bath to charge the fresh billet into the latter; and means on said elevator controlling movement of said holders through said bath.

7. In combination with heating means for metal pieces, a rotatable carrier arranged to move said pieces through said heating means in a circular path concentric with the axis of rotation of the carrier; and a circular stepping cam, rotatable in a plane including the axis of rotation of said carrier, operatively associated with said carrier, and operable to control movement of the latter relative to said heating means.

8. In combination with heating means for metal pieces, a rotatable carrier arranged to move said pieces through said heating means in a circular path concentric with the axis of rotation of the carrier; a circular elevator, rotatable in a plane including the axis of rotation of said carrier, and operable to remove a heated piece from the latter and replace such piece with a fresh piece; and interengaged cam means on said carrier and said elevator operable to step the carrier relative to said heating means in coordination with each cycle of operation of said elevator.

9. In combination with a heating bath for metal pieces, a carrier movable along said bath and including a plurality of equally spaced arms normal to the bath longitudinal center line and movable sidewise along the latter; a cam follower on the outer end of each arm; and a cam movable in a plane perpendicular to the longitudinal centerline of said bath and having cam tracks engaged with said cam followers to control movement of the carrier relative to said bath.

10. In combination with an annular heaitng bath for metal pieces, a carrier mounted for rotation on the axis of said bath and including a plurality of equally spaced radial arms having outer ends circumferentially aligned over said bath; and a circular cam rotatable in a plane including the axis of said bath and having cam tracks engaged with said cam followers to control movement of the carrier relative to said bath.

11. In combination with a heating bath for metal billets, a plurality of perforated holders each arranged to receive one of said billets; a travelling carrier arranged to receive and support said holders for movement through said heating bath; charge-discharge means operatively associated with said bath and operable to remove a holder from the carrier, eject the heated billet from the holder, charge a new billet into the holder, and replace the holder on the carrier; and interengaged stepping cam means on said carrier and said charge-discharge means operable to step the carrier relative to said heating bath in coordination with each cycle of operation of said charge-discharge means.

12. Metal billet handling apparatus comprising, in combination an annular metal heating bath; a plurality of perforate holders each arranged to receive one of said billets; a carrier mounted for rotation on the axis of said bath, and arranged to receive and support said holders for movement through said heating bath; a circular elevator, rotatable in a plane including the axis of rotation of said carrier, and operatively associated with said carrier; means operatively associated with said cam and operable, during each operating cycle of said elevator, to remove a holder from the latter, eject the heated billet from the holder, charge a new billet into the holder, and replace the holder on the carrier; and interengaged means on said carrier and on said elevator operable to step the carrier relative to said heating bath in coordination with each operating cycle of said elevator.

13. In combination with a heating bath for metal billets, a plurality of perforate holders each arranged to receive one of said billets; a carrier movable along said bath and including a plurality of equally spaced arms normal to the bath longitudinal center line and movable sidewise along the latter; receiving means adjacent the outer ends of each pair of adjacent arms arranged to receive and support a holder for movement through the bath; a cam follower on the outer end of each arm; charge-discharge means operatively associated with said bath and operable, during each operating cycle, to remove a holder from the carrier, eject the heated billet from the holder, charge a new billet into the holder, and replace the holder on the carrier; cam tracks movable by said charge-discharge means in a plane perpendicular to the longitudinal center line of said bath and engaged with said cam followers to step the carrier relative to said bath in coordination with each operating cycle of said charge-discharge means.

14. Metal billet handling apparatus comprising, in combination an annular metal heating bath; a plurality of perforate holders each arranged to receive one of said billets; a carrier mounted for rotation on the axis of said bath and including a plurality of equally spaced radial arms having outer ends circumferentially aligned over said bath; receiving means adjacent the outer ends of each pair of adjacent arms arranged to receive and support a holder for movement through the bath; a cam follower on the outer end of each arm; a circular elevator rotatable in a plane including the axis of said bath and operable, during each operating cycle, to remove a holder from the carrier, eject the heated billet from the holder, charge a new billet into the holder, and replace the holder on the carrier; and cam tracks on said elevator engaged with said cam followers to step the carrier relative to said bath in coordination with each operating cycle of said elevator.

15. Metal billet handling apparatus comprising, in combination an annular metal heating bath; a plurality of perforate holders each arranged to receive one of said billets; a carrier mounted for rotation on the axis of said bath and including a plurality of equally spaced radial arms having outer ends circumferentially aligned over said bath; receiving means adjacent the outer ends of each pair of adjacent arms arranged to receive and support a holder for movement through the bath; a cam follower on the outer end of each arm; a circular cam rotatable in a plane including the axis of said bath and having cam tracks engaged with said cam followers to step the carrier relative to said bath; a hook on said cam movable between a pair of adjacent carrier arms to pick a holder therefrom while the carrier is locked against rotation by interengagement of said cam tracks and followers; a support on said cam spaced circumferentially from said hook to receive and support the removed billet holder; means operable to eject the billet from the holder on said cam; and mechanism operable to move a fresh billet into the holder on said cam; said cam being reversible in direction to move the re-filled holder onto said receiving means for travel through said bath and to step the carrier.

References Cited in the file of this patent

UNITED STATES PATENTS

| | | |
|---|---|---|
| 1,996,335 | Jones et al. | Apr. 2, 1935 |
| 2,328,050 | Bullard 3rd | Aug. 31, 1943 |